(12) United States Patent
Streinz et al.

(10) Patent No.: US 7,990,153 B2
(45) Date of Patent: Aug. 2, 2011

(54) COMPENSATED DIRECTIONAL RESISTIVITY MEASUREMENTS

(75) Inventors: Christopher C. Streinz, Hersey, ME (US); Tsili Wang, Katy, TX (US)

(73) Assignee: Smith International, Inc., Houston, TX (US)

(*) Notice: Subject to any disclaimer, the term of this patent is extended or adjusted under 35 U.S.C. 154(b) by 276 days.

(21) Appl. No.: 12/463,577

(22) Filed: May 11, 2009

(65) Prior Publication Data

US 2010/0283470 A1 Nov. 11, 2010

(51) Int. Cl.
*G01V 3/08* (2006.01)
*G01V 3/00* (2006.01)

(52) U.S. Cl. ......................... 324/338; 324/346

(58) Field of Classification Search .................. 324/338, 324/346
See application file for complete search history.

(56) References Cited

U.S. PATENT DOCUMENTS

| | | | |
|---|---|---|---|
| 5,045,795 A | 9/1991 | Gianzero et al. |
| 6,181,138 B1 | 1/2001 | Hagiwara et al. |
| 6,297,639 B1 | 10/2001 | Clark et al. |
| 6,476,609 B1 | 11/2002 | Bittar |
| 6,509,738 B1 | 1/2003 | Minerbo et al. |
| 6,556,015 B1 | 4/2003 | Omeragic et al. |
| 6,566,881 B2 | 5/2003 | Omeragic et al. |
| 6,573,722 B2 | 6/2003 | Rosthal et al. |
| 6,765,386 B2 | 7/2004 | Gianzero et al. |
| 6,819,110 B2 | 11/2004 | Omeragic et al. |
| 6,836,218 B2 | 12/2004 | Frey et al. |
| 6,903,553 B2 | 6/2005 | Itskovich et al. |
| 6,911,824 B2 | 6/2005 | Bittar |
| 6,937,022 B2 | 8/2005 | Itskovich et al. |
| 6,969,994 B2 | 11/2005 | Minerbo et al. |
| 6,998,844 B2 | 2/2006 | Omeragic et al. |
| 7,003,401 B2 | 2/2006 | Haugland |
| 7,019,528 B2 | 3/2006 | Bittar |
| 7,038,457 B2 | 5/2006 | Chen et al. |
| 7,057,392 B2 | 6/2006 | Wang et al. |
| 7,138,803 B2 | 11/2006 | Bittar |
| 7,202,670 B2 | 4/2007 | Omeragic et al. |
| 7,265,552 B2 | 9/2007 | Bittar |
| 7,269,515 B2 | 9/2007 | Tabarovsky et al. |
| 7,274,991 B2 | 9/2007 | Tabarovsky et al. |
| 7,286,091 B2 | 10/2007 | Chen et al. |
| 7,345,487 B2 | 3/2008 | Bittar et al. |
| 7,353,613 B2 | 4/2008 | Bartel et al. |
| 7,382,135 B2 | 6/2008 | Li et al. |
| 7,385,400 B2 | 6/2008 | Moore |
| 7,414,407 B2 | 8/2008 | Wang et al. |
| 7,436,184 B2 | 10/2008 | Moore |
| 7,463,035 B2 | 12/2008 | Merchant et al. |
| 7,471,088 B2 | 12/2008 | Yu et al. |
| 2007/0257677 A1 | 11/2007 | Wang |
| 2008/0068022 A1 | 3/2008 | Peter et al. |
| 2008/0074336 A1 | 3/2008 | Signorelli et al. |
| 2008/0078580 A1 | 4/2008 | Bittar |

(Continued)

OTHER PUBLICATIONS

International Search Report and Written Opinion dated Dec. 23, 2010 for corresponding PCT application No. PCT/US2010/034285 filed May 11, 2010.

Fang, S., et al.; "Determination of structural dip and azimuth from LWD azimuthal propagation resistivity measurements in anisotropic formations". 2008 SPE Annual Technical Conference and Exhibition, Denver, CO, Sep. 21-24, 2008.

(Continued)

*Primary Examiner* — Bot L LeDynh

(57) ABSTRACT

A method for making directional resistivity measurements includes sequentially transmitting first and second axial and transverse electromagnetic waves in a borehole and receiving substantially pure axial and transverse components of each of the transmitted waves. A composite ratio of the received components is computed and may be utilized as an indicator of various formation parameters. The invention advantageously provides for the acquisition of compensated directional resistivity measurements.

26 Claims, 5 Drawing Sheets

U.S. PATENT DOCUMENTS

2008/0158082 A1  7/2008  Wang et al.
2008/0246486 A1  10/2008 Forgang et al.
2008/0290873 A1  11/2008 Homan et al.
2009/0015261 A1  1/2009  Yang et al.

OTHER PUBLICATIONS

Li, Q., et al.; "New directional electromagnetic tool for proactive geosteering and accurate formation evaluation while drilling". SPWLA 46th Annual Logging Symposium, Jun. 26-29, 2005, pp. 1-16.

COMPENSATED DIRECTIONAL RESISTIVITY MEASUREMENTS

RELATED APPLICATIONS

None.

FIELD OF THE INVENTION

The present invention relates generally to methods for making directional resistivity measurements of the electromagnetic properties of a subterranean borehole. More particularly, method embodiments of this invention include compensating directional resistivity measurements by computing a composite ratio of axial and transverse components of received electromagnetic waves.

BACKGROUND OF THE INVENTION

The use of electrical measurements in prior art downhole applications, such as logging while drilling (LWD), measurement while drilling (MWD), and wireline logging applications is well known. Such techniques may be utilized to determine a subterranean formation resistivity, which, along with formation porosity measurements, is often used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Directional resistivity measurements are also commonly utilized to provide information about remote geological features (e.g., remote beds, bed boundaries, and/or fluid contacts) not intercepted by the measurement tool. Such information includes, for example, the distance from and direction to the remote feature. In geosteering applications, directional resistivity measurements may be utilized in making steering decisions for subsequent drilling of the borehole. For example, an essentially horizontal section of a borehole may be routed through a thin oil bearing layer. Due to the dips and faults that may occur in the various layers that make up the strata, the distance between a bed boundary and the drill bit may be subject to change during drilling. Real-time distance and direction measurements may enable the operator to adjust the drilling course so as to maintain the bit at some predetermined distance from the boundary layer. Directional resistivity measurements also enable valuable geological information to be estimated, for example, including the dip and strike angles of the boundary as well as the vertical and horizontal conductivities of the formation.

Methods are known in the art for making LWD directional resistivity measurements. For example, LWD directional resistivity tools commonly measure or estimate a magnetic cross-component (e.g., the $H_{zx}$ component) of the electromagnetic radiation as the tool rotates in the borehole (e.g., during drilling). Various tool configurations are known in the art for measuring such cross components. For example, U.S. Pat. No. 6,181,138 to Hagiwara teaches a method that employs an axial transmitting antenna and three co-located, circumferentially offset tilted receiving antennae. U.S. Pat. Nos. 6,969,994 to Minerbo et al., 7,202,670 to Omeragic et al., and 7,382,135 to Li et al teach a method that employs an axial transmitting antenna and two axially spaced tilted receiving antennae. The receiving antennae are further circumferentially offset from one another by an angle of 180 degrees. U.S. Pat. Nos. 6,476,609, 6,911,824, 7,019,528, 7,138,803, and 7,265,552 to Bittar teach a method that employs an axial transmitting antenna and two axially spaced tilted receiving antennae in which the tilted antennae are tilted in the same direction. While tilted antennae have been utilized commercially, one drawback with their use is that they transmit and/or receive mixed mode electromagnetic waves which do not allow small (e.g., transversal) signals to be easily separated out in the presence of measurement noises.

U.S. Pat. Nos. 7,057,392 and 7,414,407 to Wang et al teach a method that employs an axial transmitting antenna and two longitudinally spaced transverse receiving antennae. When the transmitter is fired each receiver measures the $H_{zx}$ cross-component. These cross components are then averaged (combined additively) to suppress tool bending effects. In order to make reliable measurements, the transmitter and/or receiver gain must remain constant, which can be problematic as the borehole temperature and pressure commonly fluctuate in downhole operations. Moreover, transmitter and receiver electronic noise (in both amplitude and phase) can erode the accuracy and consistency of directional resistivity measurements.

While the above described methods (and the associated LWD resistivity tools) have been used commercially, there remains a need for further improved methods for making LWD directional resistivity measurements and in particular methods for improving the accuracy of such directional resistivity measurements.

SUMMARY OF THE INVENTION

Aspects of the present invention are intended to address the above described need for improved methods for making directional resistivity measurements. In one exemplary embodiment, the invention includes sequentially transmitting axial and transverse electromagnetic waves in a borehole and receiving substantially pure axial and transverse components of each of the transmitted waves. The electromagnetic waves are preferably transmitted using first and second collocated transmitting antennae and received using first and second collocated receiving antennae. A composite ratio of the received axial and transverse components is computed and may be advantageously utilized as an indicator of various formation parameters.

Exemplary embodiments of the present invention may advantageously provide several technical advantages. For example, by computing a composite ratio the invention enables the transmitter moments, the receiver moments, as well as electronic errors (in both amplitude and phase) to be mathematically canceled out of the voltage (or magnetic field) measurements. By eliminating these error sources, the invention provides for directional resistivity measurements having improved accuracy. The result is a fully compensated directional resistivity measurement.

In certain advantageous embodiments of the invention, the azimuthal sensitivity of the computed composite ratio is approximately proportional to the received cross-component $V_{zx}$ (or $H_{zx}$). The invention is further advantageous over the prior art in that it requires minimal downhole processing and is therefore well suited for use with downhole microcontrollers having limited processing power.

Moreover, in certain embodiments of the invention, the composite ratio allows the near-bed anisotropy effect to be cancelled from two asymmetric transmitters without explicitly involving the antenna spacing in the calculation. This feature of the invention advantageously provides for a reduction in error since the downhole temperature and pressure conditions can cause tool body deformation and therefore uncertainty in the precise antenna spacing.

In one aspect the present invention includes a method for making a directional resistivity measurement in a subterranean borehole. The method includes rotating a directional resistivity tool in a borehole. The tool includes at least first and second transmitting antennae configured to transmit corresponding substantially pure z-mode and x-mode electromagnetic waves and at least first and second receiving antennae longitudinally spaced from the transmitting antennae and configured to receive corresponding substantially pure z-mode and x-mode components of an electromagnetic wave. The method further includes causing the first and second transmitting antennae to sequentially transmit corresponding first and second z-mode and x-mode electromagnetic waves and causing the first and second receiving antennae to receive substantially pure z-mode and x-mode components of each of the transmitted electromagnetic waves. A composite ratio of the z-mode and x-mode components is then computed.

In another aspect, the present invention includes a method for making directional resistivity measurements in a subterranean borehole. The method includes rotating a directional resistivity tool in the borehole. The tool includes a pair of collocated receiving antennae deployed between first and second pairs of collocated transmitting antennae. The pair of receiving antennae includes first and second receiving antennae configured to receive substantially pure z-mode and x-mode components of an electromagnetic wave. Each of the pairs of transmitting antennae include first and second transmitting antennae configured to transmit substantially pure z-mode and x-mode electromagnetic waves. The first and second pairs of transmitting antennae are axially asymmetrically spaced about the receiving antennae such that $L_1 \neq L_2$, wherein $L_1$ and $L_2$ represent axial distances between the pair of receiving antennae and the corresponding first and second pairs of transmitting antennae. The method further includes causing the first pair of transmitting antennae to sequentially transmit z-mode and x-mode electromagnetic waves at a corresponding first frequency $f_1$ and causing the first and second receiving antennae to receive substantially pure z-mode and x-mode components of each of the transmitted electromagnetic waves. The method further includes causing the second pair of transmitting antennae to sequentially transmit z-mode and x-mode electromagnetic waves at a corresponding second frequency $f_2$ such that $f_1/f_2 = L_2^2/L_1^2$ and causing the first and second receiving antennae to receive substantially pure z-mode and x-mode components of each of the transmitted electromagnetic waves. Composite ratios of the z-mode and x-mode components received at each frequency are then computed.

In still another aspect, the invention includes a directional resistivity LWD tool. The tool includes a logging while drilling tool body having at least first and second transmitting antennae deployed thereon and configured to transmit corresponding substantially pure z-mode and x-mode electromagnetic waves. At least first and second receiving antennae are longitudinally spaced from the transmitting antennae and configured to receive corresponding substantially pure z-mode and x-mode components of an electromagnetic wave. An electronic controller is configured to: (i) cause the first and second transmitting antennae to sequentially transmit corresponding first and second z-mode and x-mode electromagnetic waves, (ii) cause the first and second receiving antennae to receive substantially pure z-mode and x-mode components of each of the electromagnetic waves transmitted in (i), and (iii) compute a composite ratio of the z-mode and x-mode components received in (ii).

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
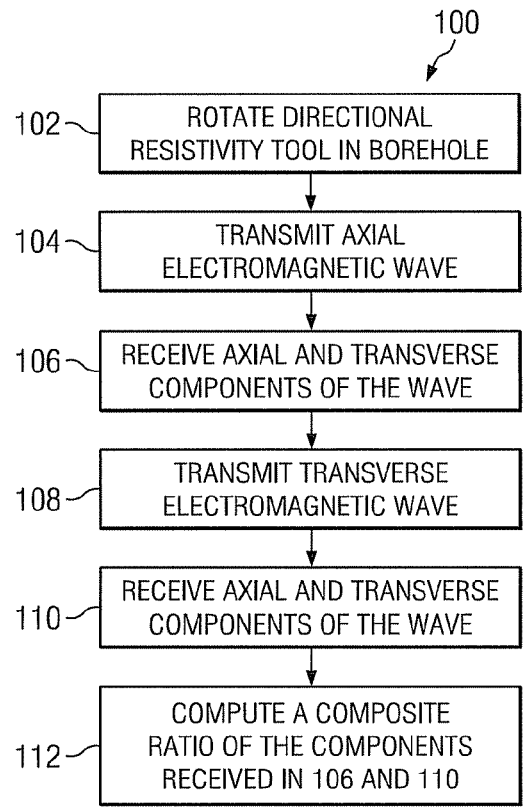
FIG. 1 depicts one exemplary method embodiment in accordance with the present invention in flow chart form.

With reference to FIG. 1, exemplary method embodiment 100 in accordance with the present invention is depicted in flowchart form. In the exemplary embodiment depicted, a directional resistivity tool is rotated in a borehole at 102. As described in more detail below, the resistivity tool includes at least first and second transmitting antennae, one of which is configured to transmit substantially pure z-mode electromagnetic waves and the other of which is configured to transmit substantially pure x-mode electromagnetic waves. The tool further includes at least first and second receiving antennae longitudinally spaced from the transmitting antennae. One of the receiving antennae is configured to receive a substantially pure z-mode component of an electromagnetic wave and another is configured to receive a substantially pure x-mode component of an electromagnetic wave. The transmitting antennae may be fired (energized) sequentially (in either order) at 104 and 108, thereby transmitting substantially pure mode electromagnetic waves into the subterranean formation. Substantially pure axial and transverse components of the electromagnetic wave may be received for each of the transmitted electromagnetic waves at 106 and 110 via the corresponding receiving antennae. A composite ratio of the received components may then be calculated at 110. The ratio is preferably computed downhole and the result stored in downhole memory and/or telemetered to the surface.

It will be appreciated that method embodiments in accordance with the present invention make use of electromagnetic (EM) directional resistivity tools having substantially pure mode transmitting and receiving antennae. Such pure mode antennae are defined with respect to the reference frame of the directional resistivity tool (or the borehole) in which one axis (typically the z-axis) is coincident with the longitudinal axis of the tool (or borehole). In this reference frame, an "axial antenna" is one in which the magnetic moment of the antenna is coincident with the tool axis. An axial antenna transmits and/or receives substantially pure axial mode (z-mode) electromagnetic waves. A "transverse antenna" is one in which the magnetic moment of the antenna is orthogonal to the tool axis. A transverse antenna transmits and/or receives substantially pure transverse mode (x-mode or y-mode) electromagnetic waves.

The antennae utilized in accordance with the present invention are configured to transmit and/or receive substantially pure mode electromagnetic waves. For example, an axial transmitting antenna transmits substantial pure z-mode electromagnetic waves when energized. A transverse receiving antenna receives substantially pure x-mode (or y-mode) electromagnetic waves. By substantially pure it is meant that the transmitting and receiving antennae are intended to transmit and/or receive pure mode electromagnetic waves. For example, a conventional axial transmitting antenna is intended to transmit pure z-mode electromagnetic waves and may therefore be said to produce substantially pure z-mode electromagnetic waves. Likewise, a conventional transverse receiving antenna is intended to receive pure x-mode electromagnetic waves and may therefore be said to receive substantially pure x-mode electromagnetic waves. This is in contrast to an antenna that is intended to transmit and/or receive a mixed mode electromagnetic wave. For example, a conventional tilted antenna is intended to transmit and/or receive a mixed mode electromagnetic wave (e.g., mixed x- and z-modes) and may therefore not be said to transmit and/or receive a substantially pure electromagnetic wave.

It will be understood by those of ordinary skill in the art that conventional axial and transverse antennae typically transmit and/or receive impure modes, e.g., due to engineering constraints. The invention is not limited in these regards. Despite the presence of such impurities (which may be, for example, on the order of a few percent), a conventional axial antenna may still be said to transmit and/or receive substantially pure z-mode electromagnetic waves. Likewise, a conventional transverse antenna may still be said to transmit and/or receive substantially pure x-mode (or y-mode) electromagnetic waves.

Figure 2A:
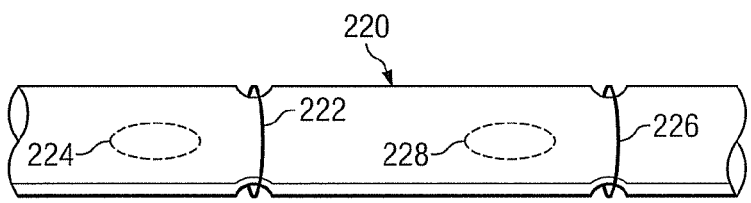
FIGS. 2A and 2B depict exemplary directional resistivity tool embodiments suitable for use with exemplary method embodiments of the present invention.
Figure 2B:
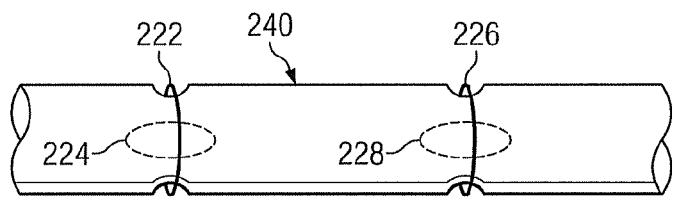

FIGS. 2A and 2B (collectively FIG. 2) depict exemplary EM directional resistivity tools 220 and 240 suitable for use with certain method embodiments in accordance with the present invention. Resistivity tool 220 (FIG. 2A) includes at least one axial transmitting antennae 222 and at least one transverse transmitting antenna 224 deployed on the tool body. The resistivity tool 220 further includes at least one axial receiving antenna 226 and at least one transverse receiving antenna 228 deployed on the tool body. In the exemplary embodiment depicted on FIG. 2A, each of the transmitting antennae 222 and 224 and the receiving antennae 226 and 228 are longitudinally spaced on the tool body. The transmitting antennae and the receiving antennae may also be collocated, for example, as depicted on FIG. 2B for tool embodiment 240. In FIG. 2B, the transmitting antennae are collocated and the receiving antennae are collocated. The invention is not limited in this regard. The transmitting antennae may be collocated and the receiving antennae longitudinal spaced or the receiving antennae may be collocated and the transmitting antennae longitudinally spaced.

It will be appreciated that suitable tool embodiments may further include multiple spaced and/or collocated transmitting and receiving antennae. For example, a suitable tool embodiment may include first and second pairs of collocated transmitting antennae and first and second pairs of collocated receiving antennae. The invention is not limited in these regards. Suitable tool embodiments may also include one or more y-mode transmitting and/or receiving antennae longitudinally spaced from or collocated with the other transmitting and receiving antennae. Moreover, as is well understood in the art, under the principle of reciprocity, each of the transmitting and receiving antennae may operate as either a transmitter or a receiver when coupled with the appropriate transmitter and/or receiver electronics.

It will further be understood that methods in accordance with the invention may make use of either EM induction or propagation measurements. In general, EM propagation tools operate in a similar fashion, but typically at higher frequencies than EM induction tools. The invention is not limited by the frequency of the electromagnetic waves. Those of ordinary skill in the art will also recognize that electromagnetic waves having multiple (2 or more) frequency components may be employed (and are commonly preferred). The invention is in no way limited in these regards.

As is known to those of ordinary skill in the art, a time varying electric current (an alternating current) in a transmitting antenna (e.g., in transmitting antennae 222 and 224) produces a corresponding time varying magnetic field in the formation. The magnetic field in turn induces electrical currents (eddy currents) in the conductive formation. These eddy currents further produce secondary magnetic fields which may produce a voltage response in one or more receiving antennae (e.g., in receiving antennae 226 and 228). The measured voltage in the receiving antennae can be processed, as is known to those of ordinary skill in the art, to obtain one or more measurements of the secondary magnetic field, which may in turn be further processed to estimate formation resistivity (conductivity) and/or dielectric constant. These electrical formation properties can be further related to the hydrocarbon bearing potential of the formation via techniques known to those of skill in the art.

With continued reference to FIGS. 1 and 2, the transmitting antennae may transmit substantially pure z-mode and x-mode electromagnetic waves at 104 and 108. Substantially pure z-mode and x-mode components of each wave may be received at 106 and 110 at least one pair of axial and transverse receiving antennae (e.g., antenna 226 and 228 on FIG. 2). A composite ratio of the received components may advantageously be calculated at 112, for example, as follows:

$$r = \frac{V_{zx}V_{xz}}{V_{zz}V_{xx}} \qquad \text{Equation 1}$$

where r represents the composite ratio, $V_{xx}$, $V_{xz}$, $V_{zx}$, and $V_{zz}$ represent the voltage responses received by the receiving antennae for each of the transmitted electromagnetic waves. It will be understood that within this system for naming the measured voltage responses (or magnetic field responses), the first index indicates the mode of the transmitter and the second index indicates the mode of the receiver.

Those of ordinary skill in the art will readily appreciate that these measured voltage responses ($V_{xx}$, $V_{xz}$, $V_{zx}$, and $V_{zz}$) may be processed to obtain the corresponding components of the induced magnetic field in the formation ($H_{xx}$, $H_{xz}$, $H_{zx}$, and $H_{zz}$). Thus, the composite ratio in Equation 1 may be alternatively (and equivalently) expressed mathematically in terms of the magnetic field components as follows (the invention is not limited in these regards):

$$r = \frac{H_{zx} H_{xz}}{H_{zz} H_{xx}} \qquad \text{Equation 2}$$

The composite rations computed in Equations 1 and/or 2 advantageously provide for fully compensated directional resistivity measurements in that they enable the transmitter moments, the receiver moments, as well as electronic errors (in both amplitude and phase) to be canceled out of the voltage (or magnetic field) measurements. As is known to those of ordinary skill in the art, the voltage measured at a receiving antenna tends to be directly proportional to the magnetic moments of both the transmitter and receiver. Phase and amplitude errors may also be introduced by the receiver electronics. As described above, transmitter and receiver gain commonly varies downhole (e.g., as the borehole temperature and/or pressure change), which can result in a varying transmitter and receiver moments. Significant tool to tool variation is also sometimes observed. The electronic errors are also known to vary with borehole temperature. Computing composite ratios in accordance with the present invention mathematically cancels these error sources and therefore provides for directional resistivity measurements having improved accuracy.

Those of ordinary skill in the art will readily appreciate that the magnetic field derived from a measured voltage at a receiving antenna is proportional to the true magnetic field in the formation, but differs therefrom due to several known factors. This distortion of the measured magnetic field may be represented mathematically, for example, as follows:

$$H(\omega) = A_T(\omega) e^{i\Delta\phi_T} A_R(\omega) e^{i\Delta\phi_R} H^*(\omega) \qquad \text{Equation 3}$$

where $H(\omega)$ represents the measured magnetic field, $H^*(\omega)$ represents the true magnetic field in the formation, $A_T(\omega)$ and $\Delta\phi_T$ represent amplitude and phase distortion of the true formation magnetic field introduced by the transmitter, and $A_R(\omega)$ and $\Delta\phi_R$ represent the amplitude and phase distortion of the true formation magnetic field introduced by the receiver, and $\omega$ represents the angular frequency of the electromagnetic wave in units of radians. As is known to those of skill in the art, the amplitude and phase errors may include the magnetic moments of the antennae, electronic drift and distortion, and other environment effects.

When the transmitting antennae are fired sequentially as described above with respect to FIG. 1, the measured magnetic fields at each of the receivers may be represented mathematically in similar form, for example, as follows:

$$H_{zz}(\omega) = A_{Tz}(\omega) e^{i\Delta\phi_{Tz}} A_{Rz}(\omega) e^{i\Delta\phi_{Rz}} H^*_{zz}(\omega)$$

$$H_{zx}(\omega) = A_{Tz}(\omega) e^{i\Delta\phi_{Tz}} A_{Rx}(\omega) e^{i\Delta\phi_{Rx}} H^*_{zx}(\omega)$$

$$H_{xz}(\omega) = A_{Tx}(\omega) e^{i\Delta\phi_{Tx}} A_{Rz}(\omega) e^{i\Delta\phi_{Rz}} H^*_{xz}(\omega)$$

$$H_{xx}(\omega) = A_{Tx}(\omega) e^{i\Delta\phi_{Tx}} A_{Rx}(\omega) e^{i\Delta\phi_{Rx}} H^*_{xx}(\omega) \qquad \text{Equation 4}$$

where $H_{xx}$, $H_{xz}$, $H_{zx}$, and $H_{zz}$ are as defined above with respect to Equation 2, $A_{Tz}(\omega)$, $\Delta\phi_{Tz}$, $A_{Tx}(\omega)$, and $\Delta\phi_{Tx}$ represent amplitude and phase errors introduced by the z-mode and x-mode transmitting antennae, and $A_{Rz}(\omega)$, $\Delta\phi_{Rz}$, $A_{Rx}(\omega)$, and $\Delta\phi_{Rx}$ represent amplitude and phase errors introduced by the z-mode and x-mode receiving antennae.

Substituting Equation 4 into Equation 2 yields:

$$r = \frac{A_{Tz}(\omega) e^{i\Delta\phi_{Tz}} A_{Rx}(\omega) e^{i\Delta\phi_{Rx}} H^*_{zx}(\omega) \cdot A_{Tx}(\omega) e^{i\Delta\phi_{Tx}} A_{Rz}(\omega) e^{i\Delta\phi_{Rz}} H^*_{xz}(\omega)}{A_{Tz}(\omega) e^{i\Delta\phi_{Tz}} A_{Rz}(\omega) e^{i\Delta\phi_{Rz}} H^*_{zz}(\omega) \cdot A_{Tx}(\omega) e^{i\Delta\phi_{Tx}} A_{Rx}(\omega) e^{i\Delta\phi_{Rx}} H^*_{xx}(\omega)} \qquad \text{Equation 5}$$

which reduces to:

$$r = \frac{H^*_{zx}(\omega) \cdot H^*_{xz}(\omega)}{H^*_{zz}(\omega) \cdot H^*_{xx}(\omega)} \qquad \text{Equation 6}$$

Those of ordinary skill in the art will readily appreciate that all of the amplitude and phase errors have been mathematically canceled out in the reduction of Equation 5 to Equation 6. The ratio r may therefore be thought of as being a fully compensated directional resistivity measurement.

It will also be appreciated that the composite ratios given in Equations 1 and 2 are especially well suited for use with downhole microcontrollers having limited processing power. Equation 1, for example, advantageously includes only two multiplication steps and one division step (i.e., the multiplication of the cross-components to obtain a first product, the multiplication of the coupled components to obtain a second product, and the division of the first product by the second product). The composite ratio computed in Equations 1 and 2 are further advantageous in that the azimuthal sensitivity of this ratio is derived from the measured cross-components $V_{zx}$ and $V_{xz}$ (specifically from the product of the cross-components). Taking the square root of the composite ration results in a quantity that is approximately proportional to the cross-components.

Figure 3A:
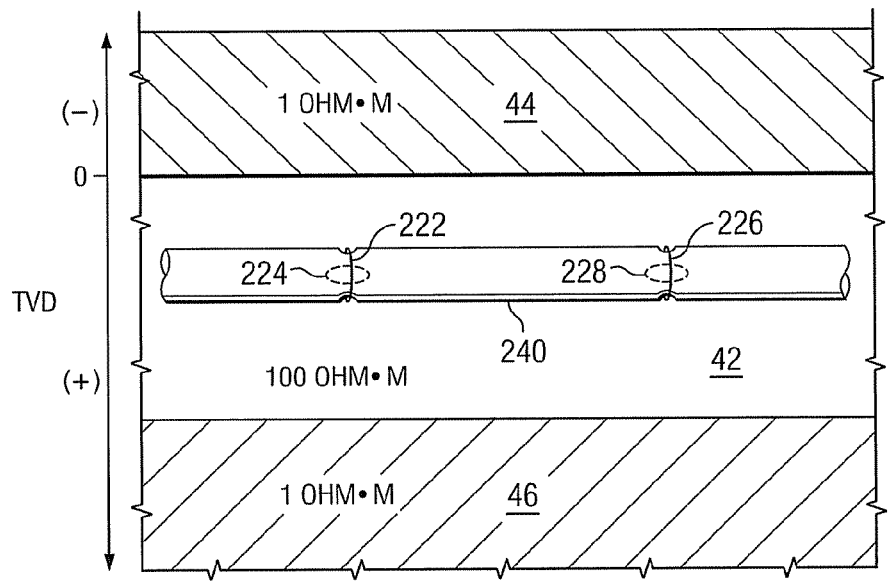
FIGS. 3A, 3B, and 3C depict a hypothetical example in which one exemplary method embodiment in accordance with the present invention is evaluated.
Figure 3B:
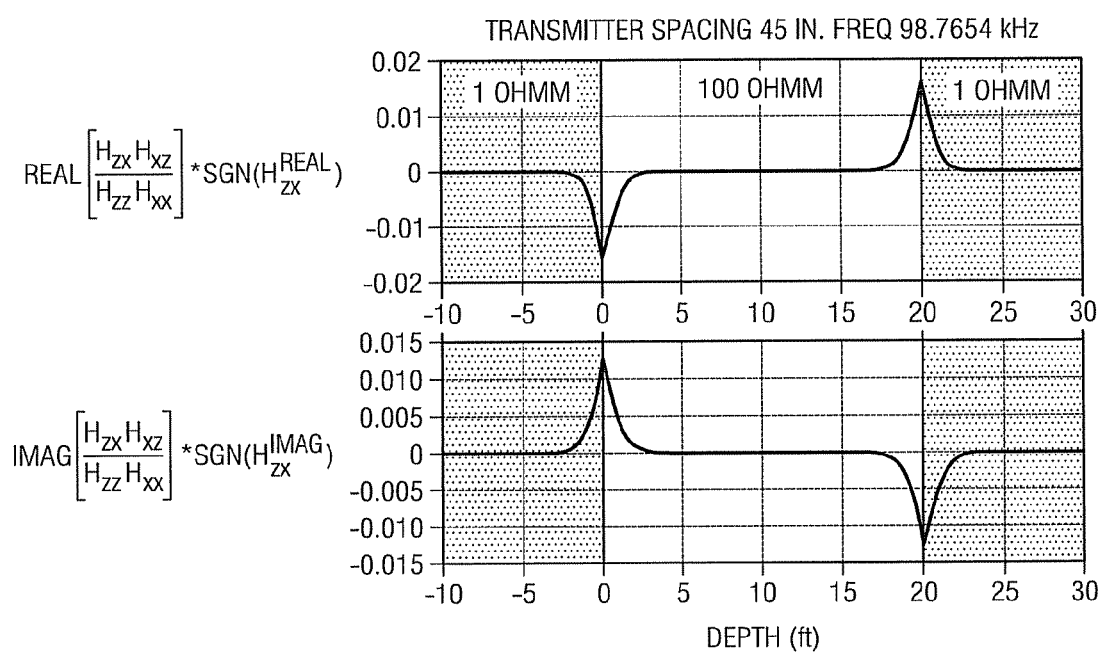
Figure 3C:
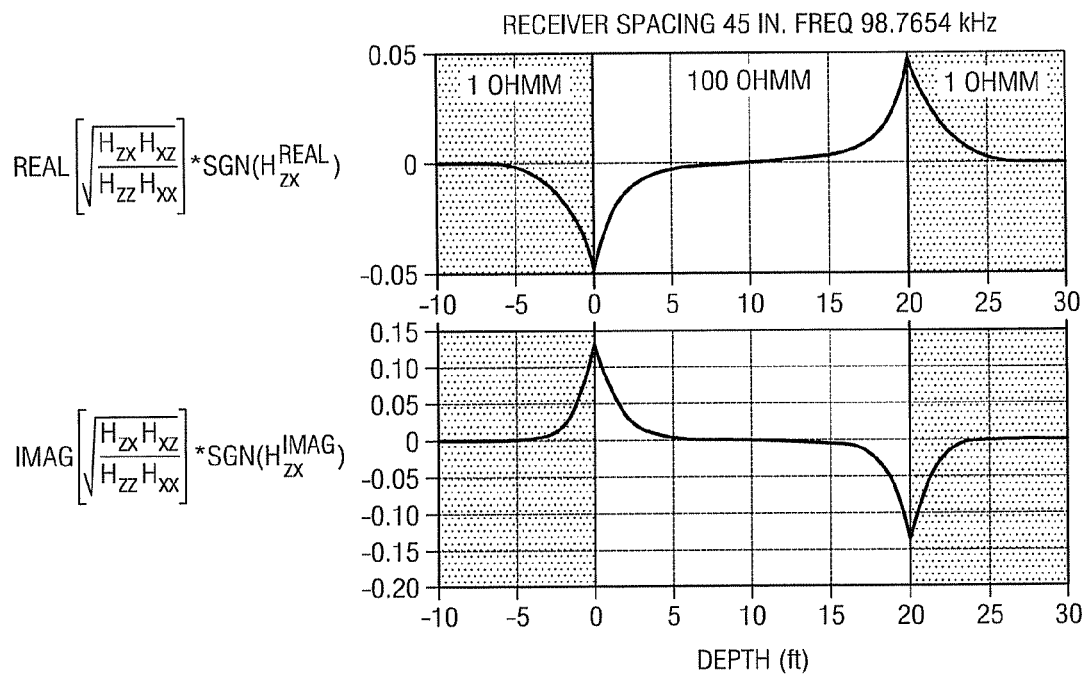

To further illustrate the azimuthal sensitivity of the composite ratio r, FIGS. 3A, 3B, and 3C, depict a hypothetical example in which one exemplary embodiment of measurement tool 240 (also depicted on FIG. 2B) is deployed in a subterranean formation. In the exemplary embodiment depicted, collocated transmitting antennae 222 and 224 are configured to transmit electromagnetic radiation at a frequency of about 98 kHz and are spaced a distance of 45 inches from collocated receiving antennae 226 and 228. Measurement tool 240 is deployed in a near-bed 42 having resistivity of 100 ohm·m. The near-bed lies between conductive layers (or beds) 44 and 46, each of which has a resistivity of 1 ohm·m. The boundary between the layers 42 and 44 is arbitrarily defined to be at zero total vertical depth (TVD). Thus, as shown, the measurement tool 240 has a positive vertical depth when located in the near-bed 42. The tool is further assumed to be at an 88 degree angle with respect to the bed boundaries.

FIG. 3B depicts a theoretical plot of the real and imaginary portions of the of the composite ratio r times the sign (positive or negative) of the $H_{zx}$ component as a function of TVD for the hypothetical model depicted on FIG. 3A. As shown, both the real and imaginary portions of the ratio are highly sensitive to the bed boundary. Moreover, the direction of the boundary is indicated by the sign (positive or negative) of the ratio. In FIG. 3B, the upper boundary layer is indicated when the real portion of the $H_{zx}$ component is positive and the imaginary portion is negative. The lower boundary is indicated when the real portion of the $H_{zx}$ component is negative and the imaginary portion is positive. FIG. 3C is similar to FIG. 3B, but depicts the real and imaginary portions of the square root of the composite ratio times the sign of the $H_{zx}$ component. Use of the square root of the composite ratio may be advantageous in that it is essentially proportional to the cross-component.

Figure 4A:
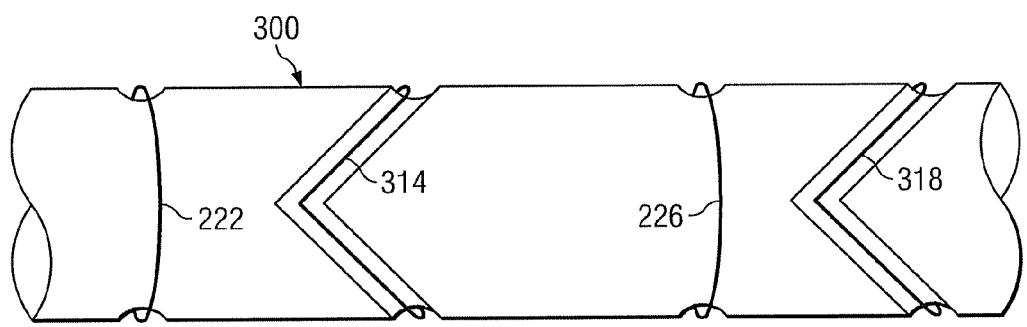
FIGS. 4A, 4B, and 4C depict another exemplary directional resistivity tool embodiment suitable for use with exemplary method embodiments of the present invention.
Figure 4B:
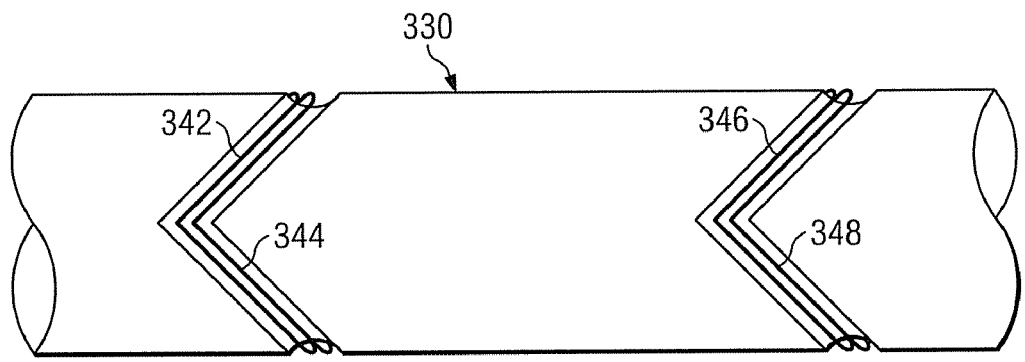
Figure 4C:
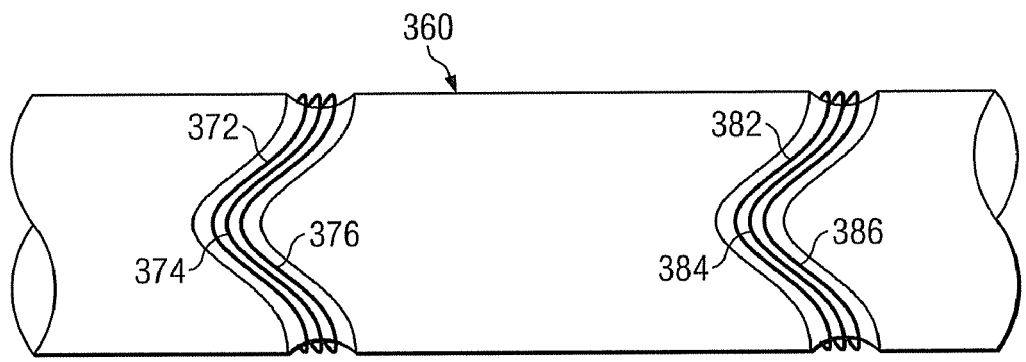

Turning now to FIGS. 4A, 4B, and 4C (collectively FIG. 4), it will be appreciated that the present invention may advantageously utilize directional resistivity tool embodiments including one or more non-planar antennae. FIG. 4A depicts a measurement tool 300 including an axial transmitting antenna 222 and an axial receiving antenna 226. Measurement tool 300 further includes a non-planar transmitting antenna 314 configured to transmit a substantially pure x-mode electromagnetic wave and a non-planar receiving antenna 318 configured to receive a substantially pure x-mode component of an electromagnetic wave.

FIG. 4B depicts a measurement tool 330 including collocated non-planar transmitting 342 and 344 and receiving 346 and 348 antennae. In the exemplary embodiment depicted transmitting antennae 342 and 344 may be configured to transmit substantially pure z-mode and x-mode electromagnetic waves and receiving antennae 346 and 348 may be configured to receive substantially pure z-mode and x-mode components of an electromagnetic wave.

FIG. 4C depicts a measurement tool 360 including collocated non-planar transmitting 372, 374, and 376 and receiving 382, 384, and 386 antennae. In the exemplary embodiment depicted transmitting antennae 372, 374, and 376 may be configured to transmit substantially pure z-mode, x-mode, and y-mode electromagnetic waves and receiving antennae 382, 384, and 386 may be configured to receive substantially pure z-mode, x-mode, and y-mode components of an electromagnetic wave.

The non-planar antennae embodiments depicted on FIG. 4 are non-planar in that the loop (or loops) of antenna wire does not reside in a single geometric plane (i.e., in a two-dimensional plane). Thought of another way, the non-planar antennae depicted on FIG. 4 cannot be projected onto a straight line from any angle (hence these antennae may also be thought of and referred to as being non-linear antennae). Such non-planar antennae are disclosed in commonly assigned, co-pending U.S. patent application Ser. No. 12/409,655, which is fully incorporated by reference herein.

The exemplary non-planar antennae embodiments depicted on FIG. 4B may be thought of as being bi-planar in that distinct portions of each antenna reside on corresponding distinct first and second planes. Each of these non-planar antennae includes first and second semi-elliptical (or semi-oval) sections, each of which resides on a corresponding distinct geometric plane. These planes are preferably orthogonal to one another (e.g., being oriented at angles of 45 and −45 degrees with respect to the tool axis), although the invention is not limited in this regard. Projection of these non-planar antennae onto a longitudinal plane forms first and second non-parallel (and non-coincident) line segments. The bi-planar antennae may therefore also be thought of as being bi-linear. Bi-planar antennae embodiments tend to be preferred for tool embodiments in which the receiving antennae are configured to receive an axial component of an electromagnetic wave and a single transverse component (x-mode) of an electromagnetic wave. Such bi-planar antenna may therefore be advantageously utilized for certain method embodiments in accordance with the present invention.

The exemplary non-planar antennae embodiments depicted on FIG. 4C may be thought of as being sinusoidal in that the axial separation between the non-planar loop of antenna wire and a circular centerline of the antennae varies substantially sinusoidally with respect to the azimuth angle about the circumference of the tool. This feature of these antennae is described in more detail in the '655 patent Application. Sinusoidal antennae embodiments tend to be preferred for tool embodiments in which the receiving antennae are configured to receive an axial component (z-mode) of an electromagnetic wave and both transverse components (x-mode and y-mode) of an electromagnetic wave. Such sinusoidal antenna may also be advantageously utilized for certain method embodiments in accordance with the present invention. For example, in certain embodiments, the invention may further include computing a second composite ratio, which may be expressed mathematically as follows: $r_2 = V_{zy}V_{yz}/V_{zz}V_{yy}$.

With continued reference to FIGS. 4A, 4B, and 4C, antennae 342, 346, 372, and 382 may be configured, for example, to transmit and/or receive a substantially pure z-mode component of an electromagnetic wave. This may be accomplished, for example (as is also described in more detail in the '655 patent Application), by connecting the transmitter/receiver electronics in series with the loop (or loops) of antenna wire. Antennae 314, 318, 344, 348, 373, and 384 may be configured to transmit and/or receive, for example, a substantially pure x-mode component of an electromagnetic wave. This may be accomplished, for example, by electrically connecting a first pair of circumferentially opposing points of the antenna wire to the transmitter/receiver electronics. Antenna 376, 386 may be configured to transmit and/or receive, for example, a substantially pure y-mode component of an electromagnetic wave. This may be accomplished, for example, by electrically connecting a second pair of circumferentially opposing points of the antenna wire to the transceiver electronics, wherein the second pair of points is offset azimuthally from the first pair of points by about 90 degrees.

The use of non-planar transmitting and/or receiving antennae advantageously simplifies the structure of a directional resistivity tool. For example, a collocated transmitter and/or receiver (e.g., as depicted on FIGS. 4B and 4C) may be deployed in a single circumferential groove (recess) about the tool body. Moreover, there is no need to form slots or cuts in the tool body for the transverse modes. This feature is especially advantageous for LWD applications in that it tends to enable high tool strengths to be maintained.

Figure 5:
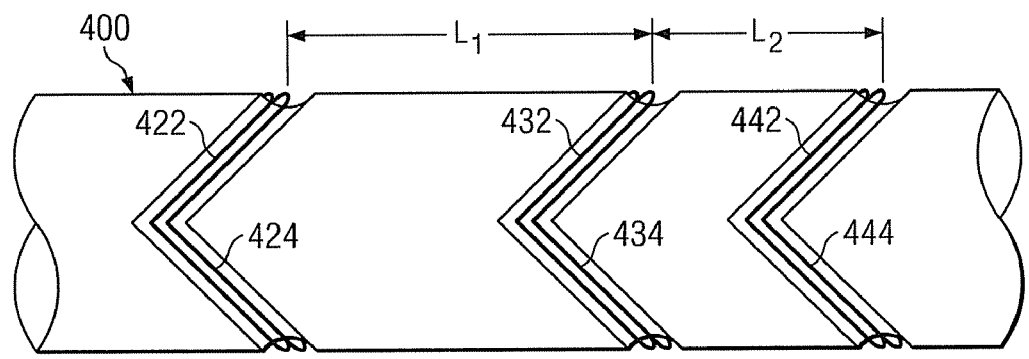
FIG. 5 depicts yet another exemplary directional resistivity tool embodiment suitable for use with exemplary method embodiments of the present invention.

Turning now to FIG. 5, another aspect of the present invention includes a method for reducing (or eliminating) the effect of near-bed anisotropy from directional resistivity measurements. FIG. 5 depicts a directional resistivity tool suitable for use with this aspect of the invention. In the exemplary tool embodiment depicted, a measurement tool 400 includes first and second pairs of collocated transmitting antennae 422, 424 and 442, 444 deployed axially asymmetrically about a pair of collocated receiving antennae 432 and 434. Transmitting antennae 422 and 424 are axially spaced from the receiving antennae 432 and 434 by a distance $L_1$, while transmitting antennae 442 and 444 are axially spaced from the receiving antennae 432 and 434 by a distance $L_2$.

The first and second pairs of collocated transmitting antennae 422, 424 and 442, 444 are configured to transmit electromagnetic waves at mutually distinct frequencies. This may be accomplished, for example, by connecting the antennae to appropriate transmitter circuits. Suitable transmitter circuits may include, for example, an oscillator that provides a predetermined alternating current signal (having a predetermined frequency or frequencies) and thereby enable the antennae to transmit electromagnetic signals at one or more frequencies (e.g., in the range from about 0.05 to about 2

MHz). In particular, the first and second pairs of collocated transmitting antennae 422, 424 and 442, 444 are configured to transmit electromagnetic waves at corresponding first and second frequencies $f_1$ and $f_2$ such that: $f_1/f_2 = L_2^2/L_1^2$, wherein $L_1$ and $L_2$ represent the axial distances between the first and second pairs of collocated transmitting antennae 422, 424 and 442, 444 and the collocated receiving antennae 432 and 434.

In the exemplary embodiment depicted, the first and second pairs of collocated transmitting antennae 422, 424 and 442, 444 are configured to transmit substantially pure z-mode and x-mode electromagnetic waves. The receiving antennae 432 and 434 are configured to receive substantially pure z-mode and x-mode components of the electromagnetic waves. For example, antenna 432 may be configured to receive substantially pure z-mode electromagnetic waves and antenna 434 may be configured to receive substantially pure x-mode electromagnetic waves. In the exemplary embodiment depicted, the transmitting antennae and receiving antennae are similar to those depicted on FIG. 4B, however it will be appreciated that this aspect of the invention is not limited to the use of non-planar antennae. Collocated axial and transverse transmitting and receiving antennae (e.g., as depicted on FIG. 2B) may also be utilized.

It will further be appreciated that the invention is not limited to embodiments employing first and second pairs of collocated transmitting antennae. The invention may utilize multiple sets of asymmetrically spaced transmitting antennae. It will be still further appreciated that the invention is not limited to embodiments employing a single pair of collocated receiving antennae. The implementation of substantially any number of spaced transmitters and receivers is described in more detail in commonly assigned, co-pending U.S. patent application Ser. No. 12/410,153, which is hereby fully incorporated by reference.

As stated above, one aspect of the present invention advantageously enables the effect of near-bed anisotropy to be significantly reduced (or substantially eliminated) using first and second asymmetrically positioned collocated transmitting antennae pairs (e.g., as depicted on FIG. 5). It is well known that the $H_{zx}$ and $H_{xz}$ cross-components and the $H_{zz}$ and $H_{xx}$ coupling components in a homogeneous, anisotropic medium may be expressed mathematically as follows:

$$H_{zx} = H_{xz} = \frac{M}{4\pi L^3}\left[\frac{\cos\theta}{\sin\theta}ik_hL(e^{ik_hL} - e^{i\beta k_hL})\right] \quad \text{Equation 7}$$

$$H_{zz} = \frac{M}{4\pi L^3}[2(1 - ik_hL)e^{ik_hL} + ik_hL(e^{ik_hL} - e^{i\beta k_hL})] \quad \text{Equation 8}$$

$$H_{xx} = \frac{M}{4\pi L^3}\begin{bmatrix} -[1 - ik_hL + (ik_hL)^2]e^{ik_hL} + \\ \frac{\cos^2\theta}{\sin^2\theta}ik_hL(e^{ik_hL} - e^{i\beta k_hL}) \end{bmatrix} \quad \text{Equation 9}$$

where M represents the transmitter moment, L represents the axial distance between the transmitter and receiver, $\theta$ represents the relative dip angle, and $k_h$ represents the wave number corresponding to the horizontal resistivity such that: $k_h = \sqrt{i\omega\mu\sigma_h}$, where $\omega$ represents the frequency of the transmitted electromagnetic radiation in units of radians, $\mu$ represents the magnetic permeability, and $\sigma_h$ represents the horizontal component of the formation conductivity. The parameter $\beta$ is related to the horizontal and vertical components of the formation conductivity and may be expressed mathematically as follows: $\beta = \sqrt{1 + (\sigma_v/\sigma_h - 1)\sin^2\theta}$, where $\theta$ and $\sigma_h$ are as defined above and $\sigma_v$ represents the vertical component of the formation conductivity.

Substituting Equations 7, 8, and 9 into Equation 2 yields:

$$r = \frac{H_{zx}H_{xz}}{H_{zz}H_{xx}} = \frac{\left[\frac{\cos\theta}{\sin\theta}ik_hL(e^{ik_hL} - e^{i\beta k_hL})\right]^2}{2(1 - ik_hL)e^{ik_hL} + ik_hL(e^{ik_hL} - e^{i\beta k_hL}) \cdot \begin{Bmatrix} -[1 - ik_hL + (ik_hL)^2]e^{ik_hL} + \\ \frac{\cos^2\theta}{\sin^2\theta}ik_hL(e^{ik_hL} - e^{i\beta k_hL}) \end{Bmatrix}} \quad \text{Equation 9}$$

One aspect of the present invention is the realization that the composite ratio r (as given in Equations 1, 2, and 9) remains the same when the properties of two measurement systems obey the following constraint:

$$\omega_1\mu_1\sigma_{h1}L_1^2 = \omega_2\mu_2\sigma_{h2}L_2^2 \quad \text{Equation 10}$$

Assuming the medium (the subterranean formation) properties to be the same (or nearly the same) for both transmitters, i.e., $\mu_1\sigma_{h1} = \mu_2\sigma_{h2}$, the constraint in Equation 10 simplifies to $f_1L_1^2 = f_2L_2^2$. Therefore, for an asymmetric system such as that depicted on FIG. 5, the composite ratios $H_{zx1}H_{xz1}/H_{zz1}H_{xx1}$ and $H_{zx2}H_{xz2}/H_{zz2}H_{xx2}$ are substantially equal when $f_1L_1^2 = f_2L_2^2$ (i.e., when $f_1/f_2 = L_2^2/L_1^2$).

Figure 6:
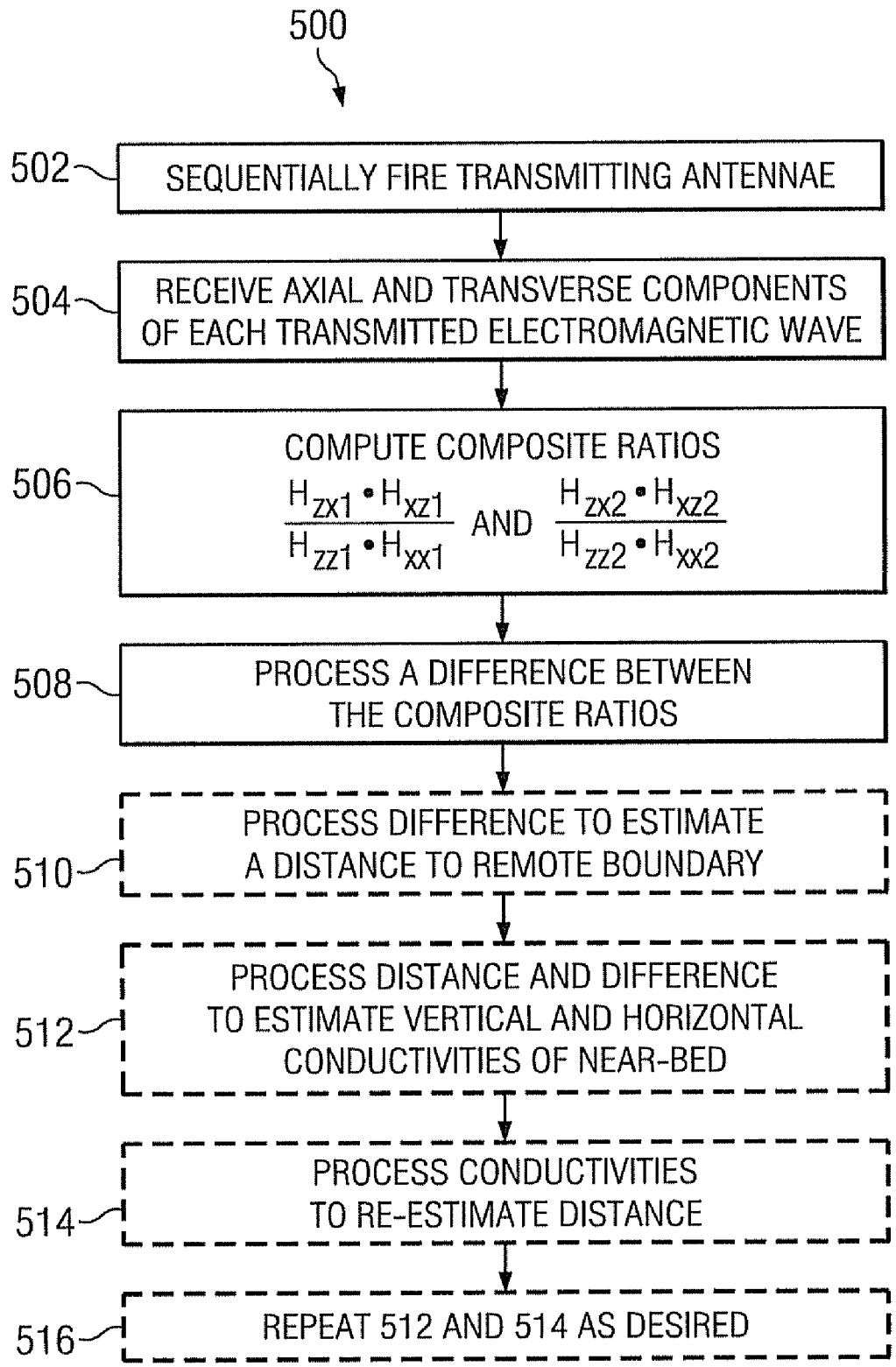
FIG. 6 depicts another exemplary method embodiment in accordance with the present invention in flow chart form.

With continued reference to FIG. 5, and further reference now to FIG. 6, one aspect of the present invention is a method 500 for removing the effect of near-bed anisotropy from compensated directional resistivity measurements. At step 502, each of the transmitting antennae 422, 424 and 442, 444 are fired sequentially. The first pair 422, 444 is fired at the first frequency $f_1$ and the second pair 442, 444 at the second frequency $f_2$. The invention is not limited by the order of transmitter firing. Either pair of transmitting antennae may be energized first. Corresponding voltage responses are measured at the collocated receiving antennae 432 and 434 at steps 504 for each of the four transmitter firings. At step 506, the composite ratios $H_{zx1}H_{xz1}/H_{zz1}H_{xx1}$ and $H_{zx2}H_{xz2}/H_{zz2}H_{xx2}$ are computed. The anisotropy effect (the near-bed response) may then be removed (or significantly reduced) at step 508 by processing a difference between the composite ratios $H_{zx1}H_{xz1}/H_{zz1}H_{xx1}$ and $H_{zx2}H_{xz2}/H_{zz2}H_{xx2}$ (e.g., $H_{zx1}H_{xz1}/H_{zz1}H_{xx1} - H_{zx2}H_{xz2}/H_{zz2}H_{xx2}$). It will be understood by those of ordinary skill in the art that method 500 may equivalently include computing and processing a difference between the composite voltage ratios $V_{zx1}V_{xz1}/V_{zz1}V_{xx1}$ and $V_{zx2}V_{xz2}/V_{zz2}V_{xx2}$. It will further be appreciated that the method 500 advantageously potentially provides for improved accuracy as compared with the methods disclosed in the '153 patent Application in that it does not require computing $L_1^3 \cdot H_{zx1}$ and $L_2^3 \cdot H_{zx2}$.

After processing the difference in step 508 (and thereby removing or significantly reducing the contribution of near-bed anisotropy), the processed ratios may be optionally further processed to estimate the distance to the remote bed (assuming there is a remote bed in sensory range of the directional resistivity measurements) and the conductivity of the remote bed. This may be accomplished, for example, at 510 by assuming an isotropic near-bed and computing conductivities of the near and remote beds and the distance from the resistivity tool to the remote bed using techniques known to those of ordinary skill in the art. At 512, the distance and remote bed conductivity estimated at 510 may be further processed in combination with the ratios to calculate vertical and horizontal conductivities of the near-bed as well as a dip angle of the near-bed. At 514, the vertical and horizontal conductivities as well as the dip angle estimated in 512 may be further processed in combination with the ratios to recalculate the distance to the remote bed and the remote bed conductivity. At 516, method steps 512 and 514 may be repeated iteratively as often as is necessary to converge on a solution for any or all of the formation parameters of interest (e.g., remote bed conductivity, near-bed vertical and horizontal conductivities, near-bed dip angle, and the distance between the measurement tool and the remote bed).

The present invention may further include correlating the above described voltage or magnetic field ratios with a measured azimuth angle so as to construct directional resistivity images. Such images are known in the art to convey the dependence of the electrical measurements on the borehole azimuth angle and the measured depth. Such images may advantageously be constructed via computing a first order harmonic representation of a plurality of measured voltage ratios as disclosed in commonly assigned, co-pending U.S. patent application Ser. No. 12/463,029.

It will be understood that the aspects and features of the present invention may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The invention is not limited in executed by a processor, as is also well known in the art. The invention is not limited in this regard. The software, firmware, and/or processing device may be included, for example, on a downhole assembly in the form of a circuit board, on board a sensor sub, or MWD/LWD sub. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

We claim:

1. A method for making a directional resistivity measurement in a subterranean borehole, the method comprising:
    (a) rotating a directional resistivity tool in a borehole, the directional resistivity tool including (i) at least first and second transmitting antennae configured to transmit corresponding substantially pure z-mode and x-mode electromagnetic waves and (ii) at least first and second receiving antennae longitudinally spaced from the transmitting antennae, the first and second receiving antenna configured to receive corresponding substantially pure z-mode and x-mode components of an electromagnetic wave;
    (b) causing the first and second transmitting antennae to sequentially transmit corresponding first and second z-mode and x-mode electromagnetic waves;
    (c) causing the first and second receiving antennae to receive substantially pure z-mode and x-mode components of each of the first and second electromagnetic waves transmitted in (b); and
    (d) computing a composite ratio of the z-mode and x-mode components received in (c).

2. The resistivity tool of claim 1, wherein the first and second transmitting antennae are collocated and the first and second receiving antennae are collocated.

3. The resistivity tool of claim 1, wherein the first and second transmitting antennae comprise collocated non-planar antennae and the first and second receiving antennae comprise collocated non-planar antennae.

4. The method of claim 1, wherein computing a composite ratio in (d) comprises:
    (i) computing a first product of first and second cross-components received in (c);
    (ii) computing a second product of first and second coupling components received in (c); and
    (iii) computing a ratio of the first and second products.

5. The method of claim 1, wherein (d) further comprises multiplying the composite ratio by a sign of a cross-component received in (c).

6. The method of claim 1, wherein (d) further comprises computing a square root of the composite ratio.

7. The method of claim 1, wherein the composite ratio is computed in (d) according to the following mathematical equation:

$$r = \frac{V_{zx} V_{xz}}{V_{zz} V_{xx}};$$

wherein r represents the composite ratio, $V_{zz}$ and $V_{zx}$ represent the z-mode and x-mode components received in (c) from the z-mode electromagnetic wave transmitted in (b), and $V_{xz}$ and $V_{xx}$ represent z-mode and x-mode components received in (c) from the x-mode electromagnetic wave transmitted in (b).

8. The method of claim 1, wherein:
    the tool further comprises a third transmitting antenna configured to transmit a substantially pure y-mode electromagnetic wave and a third receiving antenna configured to receive a substantially pure y-mode component of an electromagnetic wave;
    (b) further comprises causing the third receiving antenna to transmit a third y-mode electromagnetic wave;
    (c) further comprises causing the first, second, and third receiving antenna to receive a substantially pure z-mode, x-mode, and y-mode components of each of the first, second, and third transmitted electromagnetic waves; and
    (d) further comprises computing a composite ratio of the z-mode and y-mode components received in (c).

9. A method for making a directional resistivity measurement in a subterranean borehole, the method comprising:
    (a) rotating a directional resistivity tool in a borehole, the directional resistivity tool including (i) at least first and second transmitting antennae configured to transmit corresponding substantially pure z-mode and x-mode electromagnetic waves and (ii) at least first and second receiving antennae longitudinally spaced from the transmitting antennae, the first and second receiving antenna configured to receive corresponding substantially pure z-mode and x-mode components of an electromagnetic wave, wherein at least one of the transmitting antennae or at least one of the receiving antennae is a non-planar antenna;
    (b) causing the first and second transmitting antennae to sequentially transmit corresponding first and second z-mode and x-mode electromagnetic waves;
    (c) causing the first and second receiving antennae to receive substantially pure z-mode and x-mode components of each of the first and second electromagnetic waves transmitted in (b); and
    (d) computing a composite ratio of the z-mode and x-mode components received in (c).

10. The method of claim 9, wherein the composite ratio is computed in (d) according to the following mathematical equation:

$$r = \frac{V_{zx}V_{xz}}{V_{zz}V_{xx}};$$

wherein r represents the composite ratio, $V_{zz}$ and $V_{zx}$ represent the z-mode and x-mode components received in (c) from the z-mode electromagnetic wave transmitted in (b), and $V_{xz}$ and $V_{xx}$ represent z-mode and x-mode components received in (c) from the x-mode electromagnetic wave transmitted in (b).

11. The method of claim 9, wherein:
the tool further comprises a third transmitting antenna configured to transmit a substantially pure y-mode electromagnetic wave and a third receiving antenna configured to receive a substantially pure y-mode component of an electromagnetic wave;
(b) further comprises causing the third receiving antenna to transmit a third y-mode electromagnetic wave;
(c) further comprises causing the first, second, and third receiving antennae to receive a substantially pure z-mode, x-mode, and y-mode components of each of the first, second, and third transmitted electromagnetic waves; and
(d) further comprises computing a composite ratio of the z-mode and y-mode components received in (c).

12. The method of claim 11, wherein the first, second, and third receiving antennae comprise collocated non-planar antenna.

13. A method for making directional resistivity measurements in a subterranean borehole, the method comprising:
(a) rotating a directional resistivity tool in the borehole, the directional resistivity tool including a pair of collocated receiving antennae deployed between first and second pairs of collocated transmitting antennae, the pair of receiving antennae including first and second receiving antennae configured to receive substantially pure z-mode and x-mode components of an electromagnetic wave, each of the pairs of transmitting antennae including first and second transmitting antennae configured to transmit substantially pure z-mode and x-mode electromagnetic waves, the first and second pairs of transmitting antennae being axially asymmetrically spaced about the receiving antennae such that $L_1 \neq L_2$, wherein $L_1$ and $L_2$ represent axial distances between the pair of receiving antennae and the corresponding first and second pairs of transmitting antennae;
(b) causing the first pair of transmitting antennae to sequentially transmit first and second z-mode and x-mode electromagnetic waves at a corresponding first frequency $f_1$;
(c) causing the first and second receiving antennae to receive substantially pure z-mode and x-mode components of each of the first and second electromagnetic waves transmitted in (b);
(d) causing the second pair of transmitting antennae to sequentially transmit third and fourth z-mode and x-mode electromagnetic waves at a corresponding second frequency $f_2$ such that $f_1/f_2 = L_2^2/L_1^2$;
(e) causing the first and second receiving antennae to receive substantially pure z-mode and x-mode components of each of the third and fourth electromagnetic waves transmitted in (d); and (f) computing a first composite ratio of the z-mode and x-mode components received in (c) and a second composite ratio of the z-mode and x-mode components received in (e).

14. The method of claim 13, further comprising:
(g) processing a difference between the first and second composite ratios computed in (f).

15. The method of claim 14, wherein the difference between the first and second ratios is computed according to the equation:

$$d = \frac{V_{zx1}V_{xz1}}{V_{zz1}V_{xx1}} - \frac{V_{zx2}V_{xz2}}{V_{zz2}V_{xx2}};$$

wherein d represents the difference, $$\frac{V_{zx1}V_{xz1}}{V_{zz1}V_{xx1}}$$

represents first composite ratio, and $$\frac{V_{zx2}V_{xz2}}{V_{zz2}V_{xx2}}$$

represents the second composite ratio.

16. The method of claim 14, further comprising:
(h) processing the difference obtained in (g) to estimate a distance between the resistivity tool and a remote boundary layer.

17. The method of claim 16, further comprising:
(i) processing the distance estimate in (h) and the difference obtained in (g) to estimate vertical and horizontal conductivities of a near bed.

18. A directional resistivity tool comprising:
a logging while drilling tool body;
at least first and second transmitting antennae deployed on the tool body and configured to transmit corresponding substantially pure z-mode and x-mode electromagnetic waves;
at least first and second receiving antennae longitudinally spaced from the transmitting antennae and configured to receive corresponding substantially pure z-mode and x-mode components of an electromagnetic wave; and
a controller configured to (i) cause the first and second transmitting antennae to sequentially transmit corresponding first and second z-mode and x-mode electromagnetic waves, (ii) cause the first and second receiving antennae to receive substantially pure z-mode and x-mode components of each of the first and second electromagnetic waves transmitted in (i), and (iii) compute a composite ratio of the z-mode and x-mode components received in (ii).

19. The method of claim 18, wherein the first transmitting antenna comprises an axial antenna and the second transmitting antenna comprises a transverse antenna.

20. The method of claim 18, wherein the first receiving antenna comprises an axial antenna and the second antenna comprises a transverse antenna.

21. The method of claim 18, wherein the first and second transmitting antennae are collocated.

22. The method of claim 18, wherein the first and second receiving antennae are collocated.

23. The method of claim 18, wherein at least one of the first and second transmitting antennae or at least one of the first and second receiving antennae comprises a non-planar antenna.

24. The method of claim 18, wherein the first and second transmitting antennae comprise first and second collocated non-planar transmitting antennae and the first and second receiving antennae comprise first and second collocated non-planar receiving antennae.

25. The method of claim 18, wherein the first transmitting antennae comprises an axial transmitting antenna and the second transmitting antenna comprises a non-planar antenna configured to transmit substantially pure x-mode electromagnetic waves.

26. The method of claim 18, wherein the first receiving antennae comprises an axial receiving antenna and the second receiving antenna comprises a non-planar antenna configured to receive a substantially pure x-mode component of an electromagnetic wave.

* * * * *